Patented Dec. 11, 1934

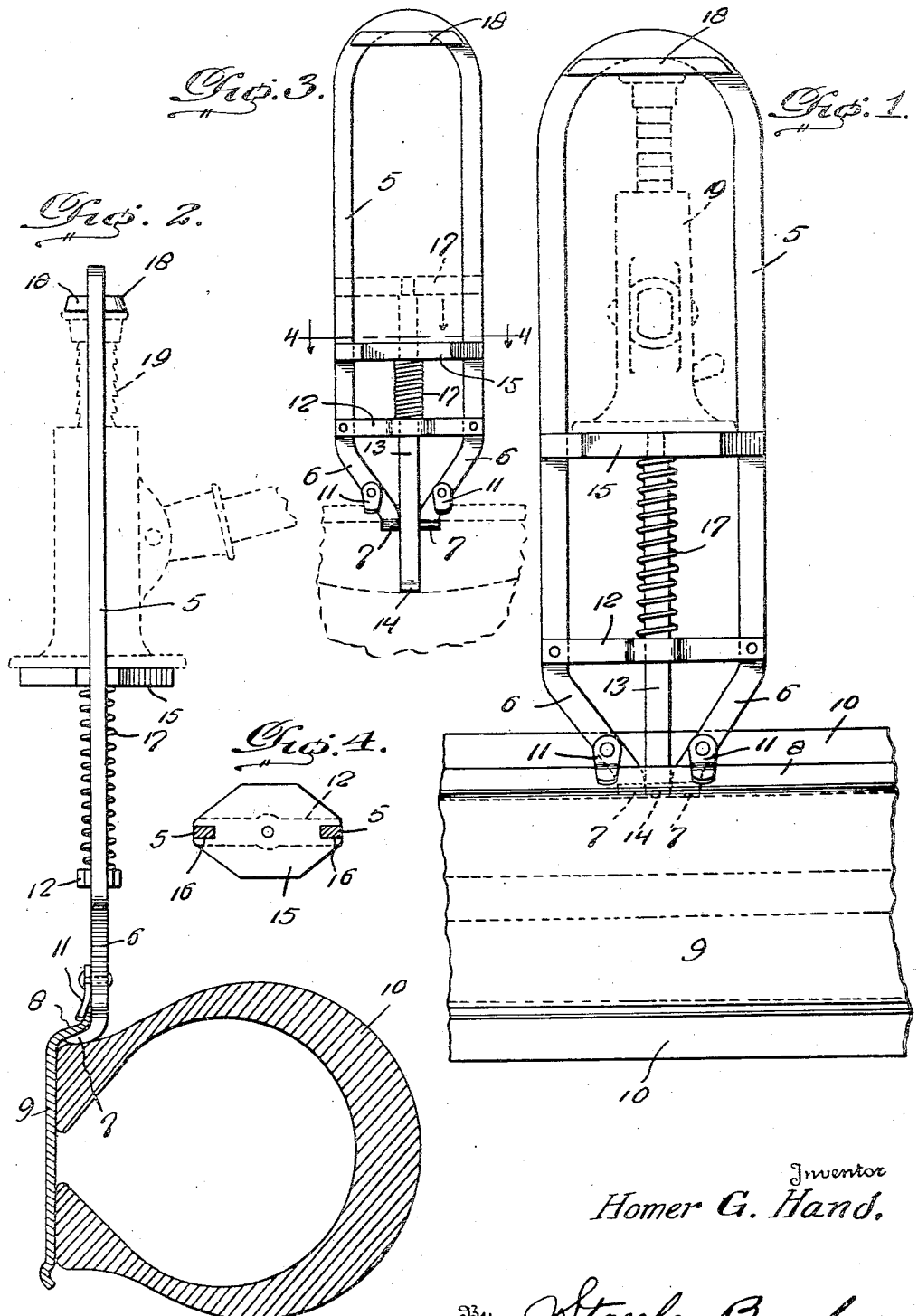

1,983,608

UNITED STATES PATENT OFFICE 1,983,608

TIRE TOOL

Homer G. Hand, Fort Myers, Fla.

Application March 1, 1934, Serial No. 713,588

5 Claims. (Cl. 157—6)

This invention relates to tire tools, and has more particular reference to a novel device adapted for use in connection with an ordinary portable jack for forcibly removing a pneumatic tire from a wheel rim of the continuous type having an integral retaining flange at one side and a removable retaining ring at the other side.

The primary object of the present invention is to provide an extremely simple, durable and efficient device of the above kind, and one which may be utilized in connection with an ordinary auto jack so that it will require no self-contained jacking mechanism and may therefore be made comparatively small in size and light in weight to facilitate storage when not in use and to facilitate handling when required for use.

With the above general objects in view, and others that will become apparent as the nature of the invention is better understood, the same consists in the novel form, combination and arrangement of parts hereinafter more fully described, shown in the accompanying drawing, and claimed.

In the drawing:

Figure 1 is a front elevational view of a tire tool embodying the present invention as it appears applied to a wheel rim preparatory to removing a tire from such rim.

Figure 2 is a side elevational view of the construction shown in Figure 1.

Figure 3 is a view similar to Figure 1, drawn on a smaller scale, and illustrating the presser-foot member in projective position, as it appears in the act of removing the tire from the rim; and Figure 4 is a transverse section on line 4—4 of Figure 3.

Referring more in detail to the drawing, the present tire tool consists of a substantially U-shaped rigid frame 5 having converging ends 6 terminating in adjacent spaced rearwardly directed prongs or hooks 7 adapted to be engaged behind the integral flange 8 provided on one side of the continuous rim 9 carrying the tire 10 to be removed. Pivoted to the rear side of the converging ends 6 of frame 5 are clamping plates or lugs 11 adapted to be engaged with the outer side of the flange 8 to removably hold the prongs or hooks 7 in engagement with the latter between the flange 8 and the adjacent bead of tire 10.

Rigidly connecting the legs of frame 5 adjacent their converging ends is a cross bar 12 having a central opening through which slidably projects a presser foot bar 13 whose outer end is provided with a rearwardly directed prong or hook normally positioned between the hooks 7 and adapted to also be engaged between the flange 8 and the adjacent bead of the tire 10, the presser prong or foot of the bar 13 being indicated at 14.

The presser foot member further includes an abutment plate or cross head 15 rigidly secured on the inner end of the presser bar 13 and having slots 16 in the ends thereof snugly receiving the legs of frame 5 so as to be guided by the latter for sliding movement longitudinally of said frame. The presser foot member is normally yieldingly retracted with the prong or foot 14 alined with the prongs or hooks 7 as shown in Figure 1, by means of a helical compression spring 17 encircling the presser bar 13 between the cross bar 12 and the cross head 15. In this normal position of the parts, the cross head 15 is located intermediate the ends of the frame 5 and in spaced relation to the outer end of said frame which may also be provided with lateral enlargements 18 to form an efficient second stationary abutment. The normal space between the sliding abutment or cross head 15 and the stationary abutment 18 is such as to accommodate an ordinary portable auto or other jack 19, when said jack is contracted, and with the base of the jack resting upon the abutment or cross head 15 and the extensible member of the jack engaging the stationary abutment 18.

With the parts normally positioned as in Figure 1, it will be seen that the prongs 7 and presser foot 14 may be readily engaged behind the flange 8, whereupon the pivoted lugs or plates 11 may be swung into engagement with the flange 8 to hold the prongs 7 into engagement with said flange. The jack 19 may be then operated to project its extensible member, thereby forcing the presser foot member outwardly against the action of spring 17, the cross head 15 sliding on the frame and the bar 13 sliding through the cross bar 12. When this is done, the adjacent portion of the tire 10 is forced away from flange 8 and partially off the rim 9, and by shifting the device or tool to various positions about the rim, the tire may ultimately be removed entirely from the rim. It will of course be understood that each time the tool is shifted relative to the rim, the jack must be contracted so as to allow spring 17 to return the presser bar member to its normal position of Figure 1. Also, before beginning use of the tool or device, the usual removable retaining ring or flange must be removed from the opposite side of the rim as shown in Figure 2. As soon as the jack is contracted, the spring 17 will return the presser foot member to normal position so that no manual effort is required to accomplish the same.

It will be seen that the present device is extremely simple and durable in construction and may be readily employed in conjunction with an ordinary portable jack for efficiently forcing a tire from its rim. Also, it will be seen that the device will be exceedingly light in weight and may be made so small as to require little storage space when not in use, as well as being capable of being readily handled when required for use. By adapting the device for use in connection with an ordinary portable jack, the device requires no self-contained jacking mechanism, and therefore possesses the advantage of simplicity and lightness over tire-removing tools having self-contained jacking mechanisms.

From the foregoing description, it is believed that the construction, operation and advantages of the present invention will be readily understood and appreciated by those skilled in the art. Minor changes are contemplated within the spirit and scope of the invention as claimed.

What I claim as new is:

1. A tire tool adapted for use in connection with an ordinary portable jack for forcibly removing a pneumatic tire from its rim, comprising an open elongated frame having spaced rim-flange engaging prongs at one end, means carried by the frame and engageable with rim flange to hold said prongs in engagement with said flange, the other end of said frame forming a jack abutment, and a presser foot member slidable in the frame and provided at its inner end with a part forming a second jack abutment, said presser foot member having a presser foot at its outer end movable in a plane between the prongs of the frame and engageable with the tire behind said rim flange, whereby upon extension of the jack engaged with said abutment, the presser foot member will be projected to force the tire from the rim.

2. A tire tool adapted for use in connection with an ordinary portable jack for forcibly removing a pneumatic tire from its rim, comprising an open elongated frame having spaced rim-flange engaging prongs at one end, means carried by the frame and engageable with the rim flange to hold said prongs in engagement with said flange, the other end of said frame forming a jack abutment, and a presser foot member slidable in the frame and provided at its inner end with a part forming a second jack abutment, said presser foot member having a presser foot at its outer end movable in a plane between the prongs of the frame and engageable with the tire behind said rim flange, whereby upon extension of the jack engaged with said abutment, the presser foot member will be projected to force the tire from the rim, said first-named means comprising clamping lugs pivoted to the frame adjacent to and inwardly of said prongs.

3. A tire tool adapted for use in connection with an ordinary portable jack for forcibly removing a pneumatic tire from its rim, comprising an open elongated frame having spaced rim-flange engaging prongs at one end, means carried by the frame and engageable with rim flange to hold said prongs in engagement with said flange, the other end of said frame forming a jack abutment, and a presser foot member slidable in the frame and provided at its inner end with a part forming a second jack abutment, said presser foot member having a presser foot at its outer end movable in a plane between the prongs of the frame and engageable with the tire behind said rim flange, whereby upon extension of the jack engaged with said abutment, the presser foot member will be projected to force the tire from the rim, said frame being of substantially U-shape and having outwardly converging outer ends the terminals of which form said prongs.

4. A tire tool adapted for use in connection with an ordinary portable jack for forcibly removing a pneumatic tire from its rim, comprising an open elongated frame having spaced rim-flange engaging prongs at one end, means carried by the frame and engageable with rim flange to hold said prongs in engagement with said flange, the other end of said frame forming a jack abutment, a presser foot member slidable in the frame and provided at its inner end with a part forming a second jack abutment, said presser foot member having a presser foot at its outer end movable in a plane between the prongs of the frame and engageable with the tire behind said rim flange, whereby upon extension of the jack engaged with said abutment, the presser foot member will be projected to force the tire from the rim, said presser foot member comprising a bar arranged intermediate the sides of the frame and slidably mounted in the latter, a guide for said bar, and a compression spring interposed between said guide and the second-named jack abutment for normally yieldingly retracting said presser foot member.

5. A tire tool adapted for use in connection with an ordinary portable jack for forcibly removing a pneumatic tire from its rim, comprising an open elongated frame having spaced rim-flange engaging prongs at one end, means carried by the frame and engageable with rim flange to hold said prongs in engagement with said flange, the other end of said frame forming a jack abutment, and a presser foot member slidable in the frame and provided at its inner end with a part forming a second jack abutment, said presser foot member having a presser foot at its outer end movable in a plane between the prongs of the frame and engageable with the tire behind said rim flange, whereby upon extension of the jack engaged with said abutment, the presser foot member will be projected to force the tire from the rim, said second-named jack abutment comprising a cross head having end slots slidably engaging the sides of the frame so as to be guided by the latter.

HOMER G. HAND.